3,686,226
17-OXYGENATED-2-OXAESTRA-1(10),4-DIEN-3-ONES AND COMPOUNDS CORRESPONDING
Raphael Pappo, Skokie, and Patricia A. Prekel, Rolling Meadows, Ill., assignors to G. D. Searle & Co., Chicago, Ill.
No Drawing. Filed Dec. 7, 1970, Ser. No. 95,969
Int. Cl. C07d 7/24
U.S. Cl. 260—343.2 S        9 Claims

ABSTRACT OF THE DISCLOSURE 2-oxaestra-1(10),4 - dienes, useful as pharmacological agents as is evidenced by their anabolic, androgenic, and anti-fertility activity, are conveniently produced from the corresponding $\Delta^{5(10)}$ and $\Delta^{4,9}$ compounds.

---

This invention is concerned with the general class of oxa-steroids, and more particularly, with 17-oxygenated-2-oxaestra-1(10),4-dien-3-ones. The compounds specifically considered can be represented by the following structural formula

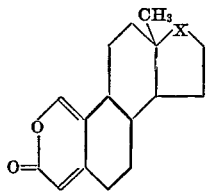

wherein X represents a carbonyl radical or a radical of the structural formula

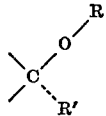

with R representing hydrogen or a lower alkanoyl radical and R' representing hydrogen, a lower alkyl or a lower alkynyl radical. The lower alkyl radicals represented by the above formula are methyl, ethyl, propyl, butyl, pentyl, hexyl, heptyl and the branched-chain isomers thereof. The radicals encompassed by lower alkanoyl are formyl, acetyl, propionyl, butyryl, valeryl, caproyl, heptanoyl and the corresponding branched-chain isomers. The lower alkynyl radicals intended are ethynyl, propynyl, butynyl, pentynyl, hexynyl, heptynyl and the branched-chain isomers thereof.

A most preferred method of manufacturing the instant compounds of the present invention begins with the bromination of the appropriate 2-oxaestr-5(10)-en-3-ones, which compounds and the method of their manufacture are described in U.S. Pats. 3,246,014 and 3,280,149, in a suitable solvent at low temperatures to produce the 5α-10β-dibromo compounds. A particular illustration is the reaction at 0° of 17β-acetoxy-2-oxaestr-5(10)-en-3-one, dissolved in chloroform, with bromine dissolved in carbon tetrachloride, to yield 17β - acetoxy - 5α,10β-dibromo - 2 - oxaestran - 3 - one. Subsequent dehydrobromination upon heating the dibromo-compound with a strongly basic amine, such as N-methylpyrrolidine, affords the desired $\Delta^{1(10),4}$ compounds, while the use of a weakly basic amine such as pyridine results in a preponderance of the $\Delta^{4,9(10)}$ product together with the $\Delta^{1(10),4}$ compound. A typical example is the refluxing of the above 17β-acetoxy - 5α,10β - dibromo - 2 - oxaestran-3-one in N-methylpyrrolidine, thus yielding 17β-acetoxy-2-oxaestra-1(10)-dien-3-one.

An alternate method for the production of the $\Delta^{1(10),4}$ compounds involves the catalytic isomerization of the corresponding $\Delta^{4,9}$ compounds, which compounds and their method of manufacture are disclosed in U.S. Pat. 3,405,-141. A particular example is the reaction of 17β-hydroxy-2-oxaestra-4,9-dien-3-one with palladium-on-carbon catalyst in ethanol which contains sodium acetate to yield 17β-hydroxy - 2 - oxaestra-1(10),4-dien-3-one.

The pharmacological activity of the novel compounds of this invention is specifically illustrated by the anabolic and androgenic activity when administered intramuscularly to rats at doses ranging from 5 to 15 mg. The specific assay used for the determination of anabolic and androgenic activity is described as follows:

Corn oil solutions or suspensions of the test compound are administered intramuscularly, daily for a period of 7 days, to a group of castrated immature male rats. On the day after the last injection the animals are sacrificed and the seminal vesicles, ventral prostate glands and levator ani muscles are removed, dissected free of extraneous tissue and weighed. Those weights are compared with the corresponding weights of organs taken from control animals, treated in the same manner save for omission of the test compound. The increases in weights of the seminal vesicles and ventral prostate glands are used as a measure of androgenicity and increases in levator ani muscle weights serve as an index of anabolic activity. A compound is rated active if it produces an increase in organ weights statistically significant at a probability level of less than 0.01.

The anti-fertility utility of the instant compounds is evident from the results of a standardized test for their capacity to inhibit the fecundity of rats. In this test, which involves substantially the procedure described by Edgren et al. in Fertility and Sterility, 12, 172 (1961), sexually mature female rats weighing approximately 200 g. are mated. Each of a group of 5 is subcutaneously injected, daily for 7 days beginning on the first day sperm appears in the vagina, with 4000 mcg. of compound dissolved or suspended in 0.1 ml. of corn oil or other inert vehicle. Several groups of such animals to which is likewise administered vehicle alone serve as controls. On the 15th ± day after the initial injection, the animals are sacrificed and their uteri inspected for placentation. A compound is considered to be fertility-inhibiting if no normal placentation site is present in more than 50% of the animals treated therewith.

The invention will appear more fully from the examples which follow. These examples are set forth by way of illustration only, and it will be understood that the invention is not to be construed as limited either in spirit or in scope by the details contained therein as many modifications both in materials and methods will be apparent from this disclosure to those skilled in the art. In these examples, temperatures are given in degrees centigrade (° C.), and quantities of materials are expressed in parts by weight unless otherwise noted.

EXAMPLE 1

To a solution of 0.318 part of 17β-acetoxy-2-oxaestr-5(10)-en-3-one in 10.5 parts of chloroform, in an ice bath, is added 0.208 part of bromine in carbon tetrachloride, and the solution is allowed to stand for about 5 minutes. After this time, 10 parts of cold 5% aqueous sodium sulfite solution is added to remove the excess bromine, and then the aqueous and organic layers are separated. The organic layer is washed with cold water, dried over sodium sulfate, and evaporated to dryness. The resulting residue is recrystallized from isopropanol to yield 17β-acetoxy - 5α,10β - dibromo - 2 - oxaestran-3-one. This compound is distinguished by nuclear magnetic resonance peaks at 52, 123, 209 and 287 hertz, and infrared absorption peaks at 3.32, 3.40, 3.46, 5.72, 6.85, 7.15, 7.26, 7.97, 8.84, 9.55 and 9.75 microns.

EXAMPLE 2

A solution of 0.100 part of 17β-acetoxy-5α,10β-dibromo-2-oxaestran-3-one in 5.7 parts of N-methylpyrrolidine is refluxed under nitrogen for 3¼ hours, after which time water and benzene are added with cooling. After the aqueous and organic layers are separated, the organic layer is washed successively with aqueous hydrochloric acid and water and dried over sodium sulfate. After subsequent solvent evaporation and drying, there is obtained 17β - acetoxy - 2 - oxaestra-1(10),4-dien-3-one, which melts at 178–182°. Additional characteristics of the above compound are an ultraviolet absorption band at 298 millimicrons with a molecular extinction coefficient of 7,276 and a nuclear magnetic resonance spectrum with peaks at 49, 119, 352 and 433 hertz. This compound is represented by the following structural formula

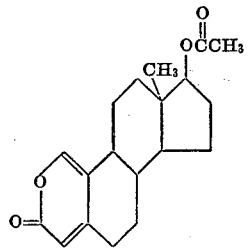

EXAMPLE 3

To 0.300 part of 17α-ethynyl-17β-hydroxy-3-oxaestr-5(10)-en-3-one dissolved in 10.5 parts of chloroform is added, at −20°, 0.16 part of bromine in carbon tetrachloride. The reaction mixture is allowed to stand for 5 minutes, after which time enough aqueous sodium sulfite solution is added to remove the excess bromine, and the organic and aqueous layers are separated. Then the organic layer is washed with water and dried over sodium sulfate. After solvent evaporation and drying in a vacuum, 5α, 10β - dibromo - 17α - ethynyl - 17β - hydroxy-2-oxaestran-3-one is isolated. This compound is characterized by nuclear magnetic resonance maxima at 55, 158, 210 and 288 hertz, and an infrared spectrum with absorption maxima at 2.82, 3.04, 3.28, 3.38, 3.47, 5.7, 6.83, 8.77, 9.48 and 9.62 microns.

EXAMPLE 4

When an equivalent quantity of 5α,10β-dibromo-17α-ethynyl - 17β - hydroxy - 2 - oxaestran - 3 - one and a reflux time of 2 hours is substituted in the procedure of Example 2, 17α - ethynyl - 17β-hydroxy-2-oxaestra-1(10),4-dien-3-one is obtained. The product exhibits a melting point at 215–220° and an absorption peak in the ultraviolet spectrum at 298 millimicrons with a molecular extinction coefficient of 6,564 and further has nuclear magnetic resonance peaks at 54, 156, 365 and 438 hertz. It is represented by the following structural formula

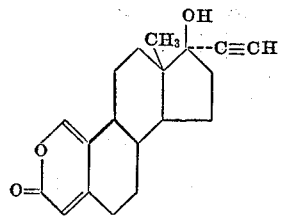

EXAMPLE 5

A solution of 0.200 part of 17β-hydroxy-17α-methyl-2-oxaestr-5(10)-en-3-one in 7.4 parts of chloroform is cooled in an ice bath to 0°, and then is treated with 0.10 part of bromine dissolved in carbon tetrachloride. The solution is kept at 0° and is stirred for 2 hours. Then the solvent is removed by evaporation into a stream of nitrogen, and the sample is dried under reduced pressure to yield, after recrystallization from isopropanol, 5α,10β-dibromo - 17β - hydroxy - 17α - methyl - 2 - oxaestran-3-one. This compound is characterized by nuclear magnetic resonance peaks at 56, 75, 209 and 288 hertz.

EXAMPLE 6

Substitution of an equivalent quantity of 5α,10β-dibromo - 17β - hydroxy - 17α - methyl-2-oxaestran-3-one and a 1 hour reflux time in the procedure of Example 2 results in the production of 17β-hydroxy-17α-methyl-2-oxaestra-1(10),4-dien-3-one, which compound melts at 193–196° and displays an ultraviolet absorption band at 296 millimicrons with a molecular extinction coefficient of 6,920. It further is represented by the following structural formula

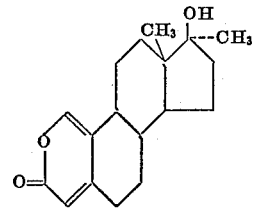

EXAMPLE 7

Upon substitution of an equivalent quantity of 17β-hydroxy - 2 - oxaestr-5(10)-en-3-one in the procedure of Example 5, there is obtained 5α,10β-dibromo-17β-hydroxy-2-oxaestran-3-one.

EXAMPLE 8

When an equivalent quantity of 5α,10β-dibromo-17β-hydroxy-2-oxaestran-3-one is substituted in the procedure of Example 2, 17β-hydroxy - 2-oxaestra-1(10),4-dien-3-one, melting at 172–175.5°, is afforded. It is distinguished by an infrared spectrum with absorption peaks at 2.76, 5.77, 6.10 and 6.50 microns and nuclear magnetic absorption maxima at 48, 225, 364 and 439 hertz. Absorption is also found in the ultraviolet spectrum at 298 millimicrons with a molecular extinction coefficient of 6,000. This compound is structurally represented by the following formula

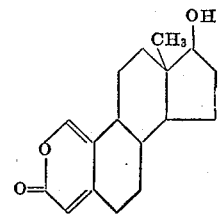

EXAMPLE 9

To 25 parts of 5% palladium-on-carbon catalyst in 816 parts of ethyl alcohol under a nitrogen atmosphere is added 50 parts of 17β-hydroxy-2-oxaestra-4,9-dien-3-one and 33 parts of sodium acetate. The stirred mixture is then brought to reflux temperature and held there for 2½ hours before filtering. After the addition of several parts of water to the filtrate, the ethyl alcohol is removed under reduced pressure and 1009 parts of 1% sodium hydroxide solution is added to the residue. After extraction of the solution with chloroform, the combined extracts are washed with a 5% sodium bicarbonate solution and with water, dried, and the solvent removed. The pure product, 17β-hydroxy-2-oxaestra-1(10),4-dien-3-one, is obtained upon recrystallization of the residue from ethanol and is identical to the product of Example 8.

The previously separated aqueous hydroxide solution is acidified with dilute hydrochloric acid to a pH of about 3 and then extracted with chloroform. The combined extracts are then extracted with a 5% sodium bicarbonate solution, washed with water, and dried. After solvent removal the pure compound, 17β-hydroxy-2-oxaestra-5,7,9-trien-3-one, is recrystallized from benzene. The compound is characterized by a melting point of 215.5–218.5°, nuclear magnetic resonance peaks at 39, 219, 319 and 418 hertz, and infrared absorption maxima at 2.76, 5.77, 7.14 and 8.00 microns. It displays anti-estrogenic activity when assayed in the rat.

EXAMPLE 10

Substitution of an equivalent quantity of 2-oxaestr-5(10)-ene-3,17-dione in the procedure of Example 5 yields 5α,10β-dibromo-2-oxaestrane-3,17-dione.

EXAMPLE 11

By substituting an equivalent quantity of 5α,10β-dibromo-2-oxaestrane-3,17-dione in the procedure of Example 2, there is obtained 2-oxaestra-1(10),4-diene-3,17-dione, which compound is represented by the following structural formula

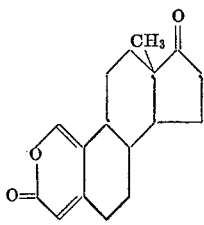

The pure product exhibits absorption peaks at 5.76, 6.10 and 6.50 microns in the infrared spectrum and is further characterized by maxima at 57, 168, 366 and 440 hertz in the nuclear magnetic resonance spectrum. The product is also found to absorb at 299 millimicrons in ultraviolet spectrum with a molecular extinction coefficient of 6,030. The product melts at 205–211° with decomposition.

EXAMPLE 12

To a mixture of 8 parts of 17β-hydroxy-2-oxaestra-1(10),4-dien-3-one and 119 parts of acetone, cooled to 0–5°, is added 8.5 parts by volume of 4 N aqueous chromic acid over a 15 minute period, and the solution is stirred while maintaining the above temperature for 45 additional minutes. The excess reagent is destroyed with isopropyl alcohol, and the volume of the solution is reduced under vacuum to ½ to ⅓ of that of the original. A precipitate is formed with the addition of water and, after subsequent stirring, washing, drying, and filtering, 2-oxaestra-1(10),4-diene-3,17-dione is isolated. This product is identical to that of Example 11.

EXAMPLE 13

By substituting an equivalent quantity of 17β-propionoxy-2-oxaestr-5(10)-en-3-one and otherwise proceeding according to the procedure of Example 1, there is afforded 5α,10β-dibromo-17β-propionoxy-2-oxaestran-3-one.

EXAMPLE 14

Substitution of an equivalent quantity of 5α,10β-dibromo-17β-propionoxy-2-oxaestran-3-one in the procedure of Example 2 results in the formation of 17β-propionoxy-2-oxaestra-1(10),4-dien-3-one.

EXAMPLE 15

When an equivalent quantity of 17β-hydroxy-17α-(1-propynyl)-2-oxaestr-5(10)-en-3-one is substituted in the procedure of Example 3, 5α,10β-dibromo-17β-hydroxy-17α-(1-propynyl)-2-oxaestran-3-one is produced.

EXAMPLE 16

When an equivalent quantity of 5α,10β-dibromo-17β-hydroxy-17α-(1-propynyl)-2-oxaestran-3-one is substituted in the procedure of Example 2, there is obtained 17β-hydroxy - 17α - (1-propynyl)-2-oxaestra-1(10),4-dien-3-one.

EXAMPLE 17

Substitution of an equivalent quantity of 17α-ethyl-17β-hydroxy-2-oxaestra-5(10)-en-3-one in the procedure of Example 5 yields 5α,10β-dibromo-17α-ethyl-17β-hydroxy-2-oxaestran-3-one.

EXAMPLE 18

Upon substituting an equivalent quantity of 5α,10β-dibromo-17α-ethyl-17β-hydroxy - 2 - oxaestran-3-one and otherwise following the procedure of Example 2, there is produced 17α-ethyl-17β-hydroxy-2-oxaestra-1(10),4-dien-3-one.

What is claimed is:
1. A compound of the formula

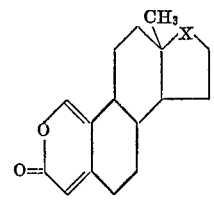

wherein X is selected from the group consisting of the carbonyl radical and radicals of the formula

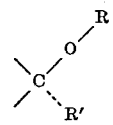

with R being hydrogen or a lower alkanoyl radical and R' being hydrogen, a lower alkyl or lower alkynyl radical.

2. As in claim 1, a compound of the formula

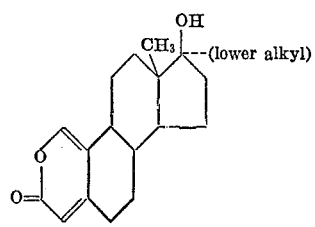

3. As in claim 1, a compound of the formula

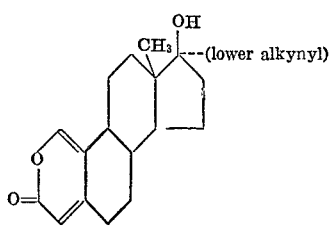

4. As in claim 1, a compound of the formula

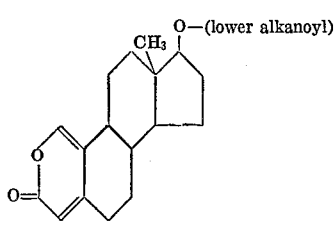

5. As in claim 1, the compound which is 2-oxaestra-1(10),4-diene-3,17-dione.

6. As in claim 1, the compound which is 17β-hydroxy-2-oxaestra-1(10),4-dien-3-one.

7. As in claim 1, the compound which is 17β-acetoxy-2-oxaestra-1(10),4-dien-3-one.

8. As in claim 1, the compound which is 17β-hydroxy-17α-methyl-2-oxaestra-1(10),4-dien-3-one.

9. As in claim 1, the compound which is 17α-ethynyl-17β-hydroxy-2-oxaestra-1(10),4-dien-3-one.

References Cited

UNITED STATES PATENTS

| | | | |
|---|---|---|---|
| 3,109,016 | 10/1963 | Nysted et al. | 260—343.2 X |
| 3,417,106 | 12/1968 | Cross | 260—343.2 X |
| 3,574,688 | 4/1971 | Bucourt et al. | 260—343.2 |

JOHN N. FORD, Primary Examiner

U.S. Cl. X.R.

424—279